US008862987B2

(12) United States Patent
Haussecker et al.

(10) Patent No.: US 8,862,987 B2
(45) Date of Patent: Oct. 14, 2014

(54) CAPTURE AND DISPLAY OF DIGITAL IMAGES BASED ON RELATED METADATA

(75) Inventors: Horst W. Haussecker, Palo Alto, CA (US); Yoram Gat, Palo Alto, CA (US); Scott M. Ettinger, San Carlos, CA (US); Igor V. Kozintsev, San Jose, CA (US); Yi Wu, San Jose, CA (US); Oscar Nestares, San Jose, CA (US)

(73) Assignee: Intel Corporation, Santa Clara, CA (US)

(*) Notice: Subject to any disclaimer, the term of this patent is extended or adjusted under 35 U.S.C. 154(b) by 927 days.

(21) Appl. No.: 12/416,040

(22) Filed: Mar. 31, 2009

(65) Prior Publication Data

US 2010/0251101 A1  Sep. 30, 2010

(51) Int. Cl.
G06F 17/00 (2006.01)
G06K 9/00 (2006.01)
H04N 5/232 (2006.01)
G06T 17/05 (2011.01)

(52) U.S. Cl.
CPC ............ *G06T 17/05* (2013.01); *H04N 5/23229* (2013.01); *H04N 5/23238* (2013.01)
USPC ........... 715/243; 715/244; 715/245; 715/246; 715/247; 715/273; 382/154

(58) Field of Classification Search
USPC .................. 715/243–247, 253, 273; 382/154
See application file for complete search history.

(56) References Cited

U.S. PATENT DOCUMENTS

| 6,278,466 | B1* | 8/2001 | Chen ............................ 345/473 |
| 6,798,897 | B1* | 9/2004 | Rosenberg .................... 382/107 |
| 6,810,152 | B2* | 10/2004 | Endo et al. .................... 382/284 |
| 7,292,261 | B1* | 11/2007 | Teo ................................ 348/36 |
| 7,324,135 | B2* | 1/2008 | Ouchi et al. ............... 348/218.1 |
| 7,747,150 | B2* | 6/2010 | Anai et al. .................... 382/154 |
| 8,300,986 | B2* | 10/2012 | Kochi et al. ................... 382/299 |
| 8,493,436 | B2* | 7/2013 | Lyon et al. ..................... 348/47 |
| 2007/0070069 | A1* | 3/2007 | Samarasekera et al. ....... 345/427 |
| 2007/0091124 | A1* | 4/2007 | Hasegawa et al. ............. 345/629 |
| 2008/0117287 | A1* | 5/2008 | Park et al. ......................... 348/36 |
| 2008/0278481 | A1* | 11/2008 | Aguera y Arcas et al. .... 345/419 |
| 2008/0291201 | A1* | 11/2008 | Lafon ............................ 345/427 |
| 2009/0208062 | A1* | 8/2009 | Sorek et al. .................... 382/107 |

FOREIGN PATENT DOCUMENTS

| JP | 2002-209208 | 7/2002 |
| JP | 2005517253 | 6/2005 |
| JP | 2007164653 | 6/2007 |
| JP | 200015583 | 1/2009 |
| WO | WO-2007057893 | 5/2007 |
| WO | WO-2008043109 | 6/2008 |

OTHER PUBLICATIONS

IBM, Utilizing Metadata Contained in Digital Image Files [IPCOM000158056D], Sep. 13, 2007, ip.com. Retrieved from http://www.ip.com/pubview/IPCOM000158056D.*

(Continued)

*Primary Examiner* — Chau Nguyen
(74) *Attorney, Agent, or Firm* — Blakely, Sokoloff, Taylor & Zafman LLP

(57) ABSTRACT

Methods and apparatuses receiving a plurality of images and metadata associated with each respective image, determining a viewpoint of one of the images of the plurality, the viewpoint to represent the location and orientation of the image capture device when the image was captured and creating a view including the plurality of images, wherein placement of the images based on each images respective metadata and the determined viewpoint.

21 Claims, 6 Drawing Sheets

(56) References Cited

OTHER PUBLICATIONS

Tan et al., Multiview Panoramic Cameras Using a Mirror Pyramid, Proceeding of IEEE Workshop on Omnidirectional Vision 2002 held in conjunction with ECCV 2002, Copenhagen, Denmark, pp. 1-14.*

Noah Snavely, Steven M. Seitz, Richard Szeliski, "Photo tourism: Exploring photo collections in 3D," ACM Transactions on Graphics (SIGGRAPH Proceedings), 25(3), Jul. 31, 2006, 835-846.

"Final Office Action for Japanese Patent Application No. 2010-073982", (Mar. 6, 2012), Whole Document.

"Office Action for Chinese Patent Application No. 20101015846.2", (Sep. 9, 2011), Whole Document.

"Office Action for Japanese Patent Application No. 2010-073982", (Nov. 11, 2011), Whole Document.

Office Action for Taiwan Patent Application No. 099109404 dated Apr. 22, 2013, 13 pages.

Notice of Grant for Chinese Patent Application No. 201010154846.2 dated Aug. 3, 2012, 3 pages.

Office Action and Search Report for Taiwan Patent Application No. 099109404, mailed Feb. 17, 2014, 14 pages.

* cited by examiner

CAPTURE AND DISPLAY OF DIGITAL IMAGES BASED ON RELATED METADATA

FIELD

Embodiments of the invention generally pertain to digital images and more specifically to the capture and display of digital images based on related metadata.

BACKGROUND

Prior to digital cameras and digital photographs (or photos), a person typically displayed her photo collection to others in a photo album, a slideshow, or simply passed a stack of photos to others for review. Digital cameras have allowed users to take and store a voluminous amount of personal digital photos. Furthermore, digital photos may be displayed individually on a computer screen, or in a digital frame, within a "digital slideshow."

A person may share her digital photo collections by uploading her images to a webservice (e.g., FLICKR®) and sharing this uploaded collection with others. Users, however, are limited to viewing these pictures individually, or as a collection of "thumbnails"—i.e., reduced sized versions of the photos to allow the simultaneous display of one or more images on a display device.

Individual or thumbnail display of digital photographs, however, gives a viewer a very limited sense of what the person who took the photographs experienced when the images were captured.

Digital video data may be uploaded and shared in a similar limited manner. Additionally, a collection digital video data is often summarized as collections of thumbnails, wherein a thumbnail represents an individual frame of each digital video in a collection. In addition to the limitations described above, thumbnail summarization does not convey enough information to a viewer about the contents a digital video collection.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

Figure 1:
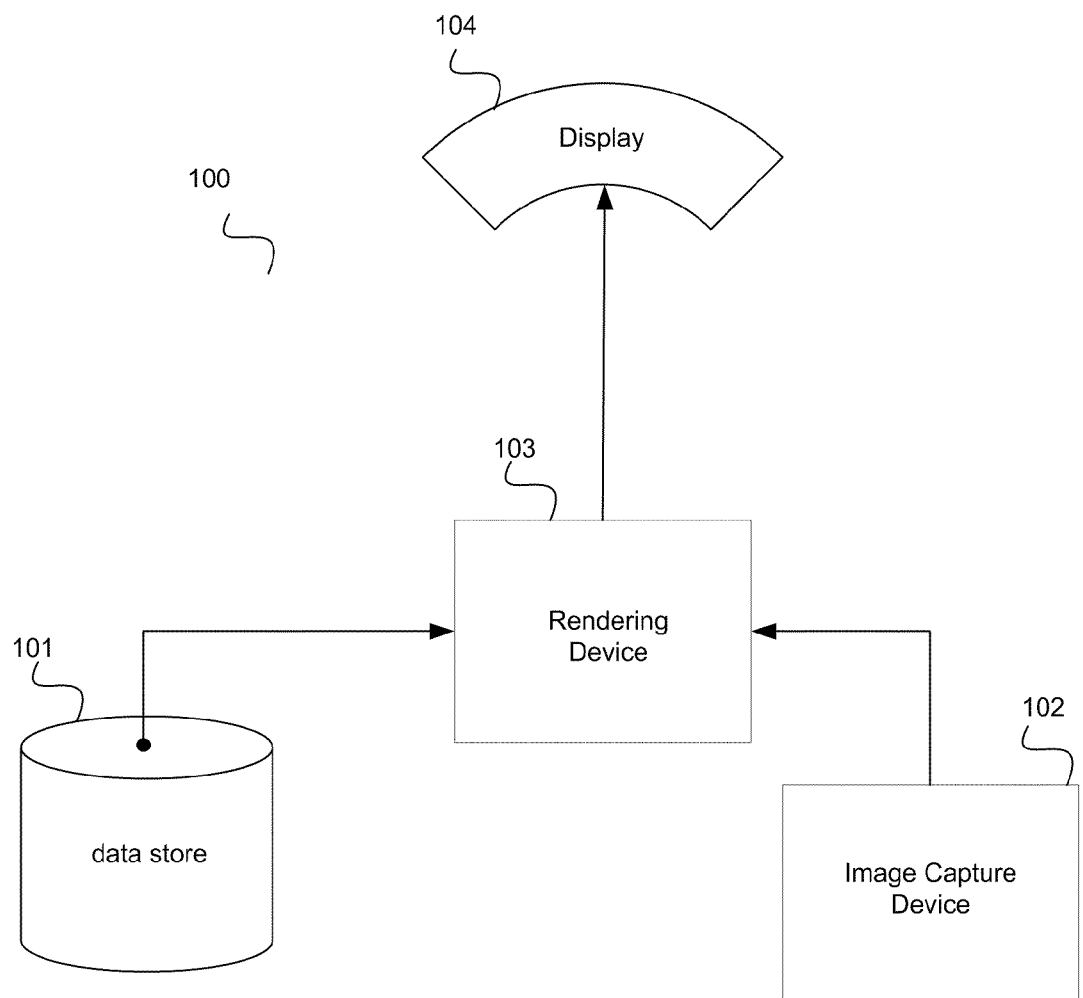
FIG. 1 is a block diagram of a system or apparatus to render and display image data according to an embodiment of the invention

Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

DETAILED DESCRIPTION

Embodiments of the present invention relate to the rendering and display of digital photo and video data. Embodiments of the present invention may be represented by a rendering and display process.

In one embodiment, a rendering device may receive a plurality of image files and metadata associated with the plurality of image files. In the embodiments described below, the term "image" may be used to refer to both a digital photo and a frame of a digital video.

The rendering device may create a view including each of the plurality of image files, wherein placement of each image file is based on the content of the image. Placement of each image within the view may further be based on the metadata associated with each image.

Prior art rendering and display processes such as MICROSOFT PHOTOSYNTH™ use large photo collections and extract multi-dimensional information from photos based purely on the image content of each photos. Because these processes are based purely on the image content of each photo, the content of the photos to be displayed in a view must overlap. Thus, an image with no overlap to any other image within the photo collection is dropped from the view. Dropping a photograph from a collection is not an acceptable result for a person displaying and sharing her own personal photo collection. However, viewing redundant information within a collection of photos can be tiresome for a viewer. For example, several images consisting of the same backdrop with relatively few changes in each image may be uninteresting to view.

Furthermore, the manner in which photo and video data may be stored and organized is limited in the prior art, as photo and video data are stored in different file formats. Thus, it is cumbersome to store and organize photo and video data consistent with the contents of said photo and video data. For example, photos and videos containing content that is spatially and/or temporally close are usually not stored and/or organized to reflect this closeness using prior art methods for storage and organization.

In one embodiment, a rendering device receives a plurality of images and related metadata to create an immersive view of the images. Because images are received with related metadata, said rendering device need not receive a large photo collection, and the content of the received photos do not need overlap.

Image metadata may be captured from any device or collection of devices with environmental and orientation sensing abilities. Metadata associated with an image file may include geographical information, magnetic field information (e.g., magnetic pole directional information), spatial information (including information related to movement—i.e., acceleration and angular momentum) and temporal information. Any combination of such environmental and orientation sensing metadata may alternatively be referred to as three-dimensional (3D) orientation metadata. Other labels could alternatively be applied to the related image metadata. 3D orientation metadata may be received, for example, by combinations of geographical sensors, accelerometers, magnetometers, and gyroscopes.

Geographic information may include information of the content(s) of a photo or image. Geographic information may also (or alternatively) include geographic information of an image capture device (or devices) that captured each photo or video to be rendered and displayed—i.e., information about the location and orientation of an image capture device when the device captured a photo or video.

In one embodiment, geographical information is received from a Global Navigational Satellite System (e.g., a Global Positioning System), magnetic field information is received from a magnetometer, and spatial and temporal information is based on information received from an accelerometer (to measure acceleration) and a gyroscope (to measure angular momentum). In another embodiment, all information described above is received from a single device.

A rendering device may receive a collection of photo and video data, along with sufficient related metadata, and create a view to display the collection, either in its entirety or as a summary of the collection. The file format of photo and video data files may differ. Furthermore, video data may contain additional associated data (e.g., video data files may contain corresponding sound data to be played back with the video image data). A rendering device may still process photo and video data together to create a view including photo and video data. For example, video data may be processed as a collection of consecutive unique images (i.e., frames), wherein each frame of a video is treated similar to an individual photo.

In one embodiment, a display is created as an immersive view. For example, the immersive view may be rendered as a 3D immersive environment, wherein contents of the images and/or videos are displayed in proportion to their correct size with respect to the location and orientation of the camera during video/photo acquisition, and movement is displayed in the content's proper spatial and/or temporal context.

By rendering image content based on the associated metadata, photos and video may be displayed in a variety of ways. In one embodiment, a viewpoint is established for a viewer based on the location and orientation of the camera during acquisition of one of the photos and videos of the collection, and the photo and video collection is displayed relative to this viewpoint. In another embodiment, the content of a collection of photos and/or videos is analyzed to detect redundant content. Images with redundant content may be stitched together to display an image overlapping all redundant content, thus providing an image containing more content that any one individual photo or video frame.

In one embodiment, a view of the first image is created, wherein placement of the first image is based on associated metadata of the first image. A view of the first and second image is also created, wherein placement of the first image in the view is based on metadata associated with the first image, and placement of the second image relative to the first image is based on the metadata associated with the first image, metadata associated with the second image and the placement of the first image. Thus, a view or views of the relative location and orientation of images are created, and if overlap exists, the location of the images within the view or views may be refined based on the content of the images.

Image metadata related to movement may be used to render an object to "move" across a display. In one embodiment, a collection of photos that contain (relatively) static background content may be rendered as a backdrop, and moving content may be displayed to simulate "movement" across the backdrop.

Image metadata may be used to organize the photo and video collection in a variety of ways. In one embodiment, metadata is displayed within the view as an interface to navigate the photo and/or video collections (e.g., a timebar, or a location path). Metadata may also be incorporated in a user interface to view a photo or video collection within the spatial and/or temporal context of the content of the collection.

FIG. 1 is a block diagram of a system or apparatus to render and display image data according to an embodiment of the invention. System or apparatus 100 may include rendering device 103 operatively coupled to image capture device 102 and data store 101. Additional metadata related to photos and/or videos may also be included in image capture device 102 and database 101. The rendering device may then forward the rendered data to be displayed on display 104.

In one embodiment, image capture device 102, data store 101, rendering device 103 and display 104 may be contained in a single apparatus. For example, a digital camera (102) may be operatively coupled to SECURE DIGITAL (SD) card (101) and contain a rendering module (103) to render a display on the digital camera's Liquid Crystal Display (LCD) unit. In another embodiment, image capture device 102 and data store 101 are separate devices that may contain photos and/or videos to be rendered by rendering device 103. Image capture device 102 and data store 101 may also each contain 3D orientation metadata related to the photos and/or videos.

For example, image capture device 102 may be a cell phone camera capable of capturing photos, videos and related metadata. When storage local to image capture device 102 approaches capacity, image capture device 102 may transfer contents of local storage to external data store 101. Rendering device 103 may then be called upon to render data from both image capture device 102 and data store 101. The rendered view may then be transmitted in its entirety to display 104 or buffered in segments to display 104, the rendered view buffered based on space or time.

Figure 2:
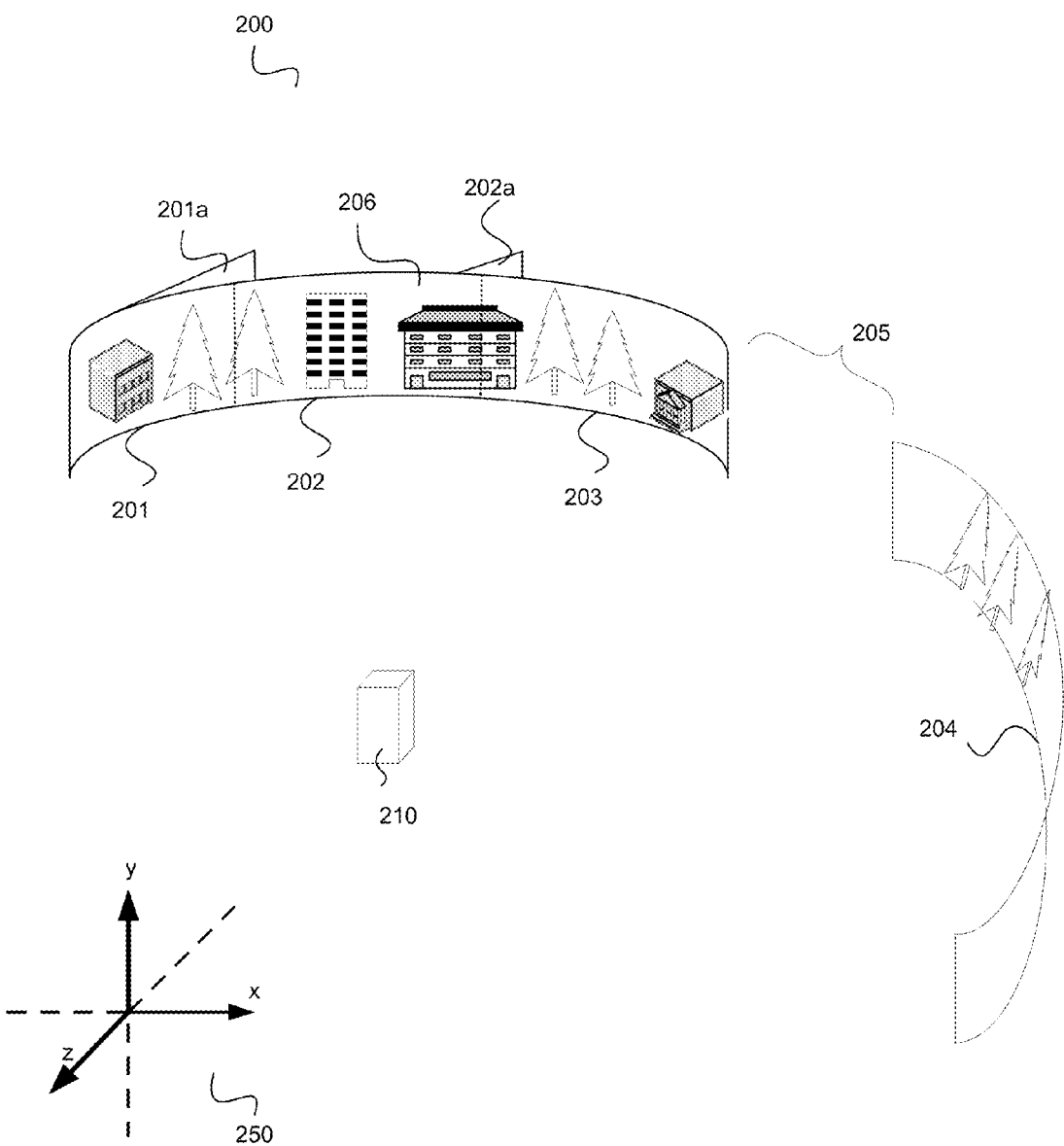
FIG. 2 is a diagram of a view of a collection of images created by a rendering device.

FIG. 2 is a diagram of a view created by a rendering device including a collection of images. Images 201, 202 and 203 include overlapping content. In the example illustrated by FIG. 2, the content of image 201 overlaps with the content of image 202. Content from image 201 redundant with content from image 202 (labeled reference element 201*a*), for example, may not be displayed within view 200. The content of image 202 and 203 overlap in a similar manner, and thus redundant content of image 202 (labeled reference element 202*a*) may not be displayed within the view. Thus, the content of images 201-203 are "stitched" together and displayed as image 206.

In the example illustrated by FIG. 2, image 204 contains no content that overlaps with the content of images 201, 202 and 203. Prior art mechanisms would not be able to display the content of image 204 in the proper spatial context with respect to the content of images 201-203. In one embodiment, the placement of 204 with respect to merged image 206 (i.e., the calculation of spacing 205 between images 204 and 206) is derived from the geo-locating metadata associated with each image. Viewpoint 210 is determined based, at least in part, on associated metadata to represent the location and orientation of the image capture device during video/photo acquisition.

In one embodiment, viewpoint 210 is further derived from the content of images 201-204. For example, geo-locating metadata captured via a GPS unit may only contain accuracy within 10 meters of the position of the image capture device when images 201-204 were captured. Furthermore, GPS data may not accurately report vertical (e.g., y-axis of 3D x, y and z axes 250) placement of the position of the image capture device when images 201-204 were captured. Therefore, the content of images 201-204 may be used in addition to geo-locating metadata (and additional 3D orientation metadata) to establish viewpoint 210.

Figure 3:
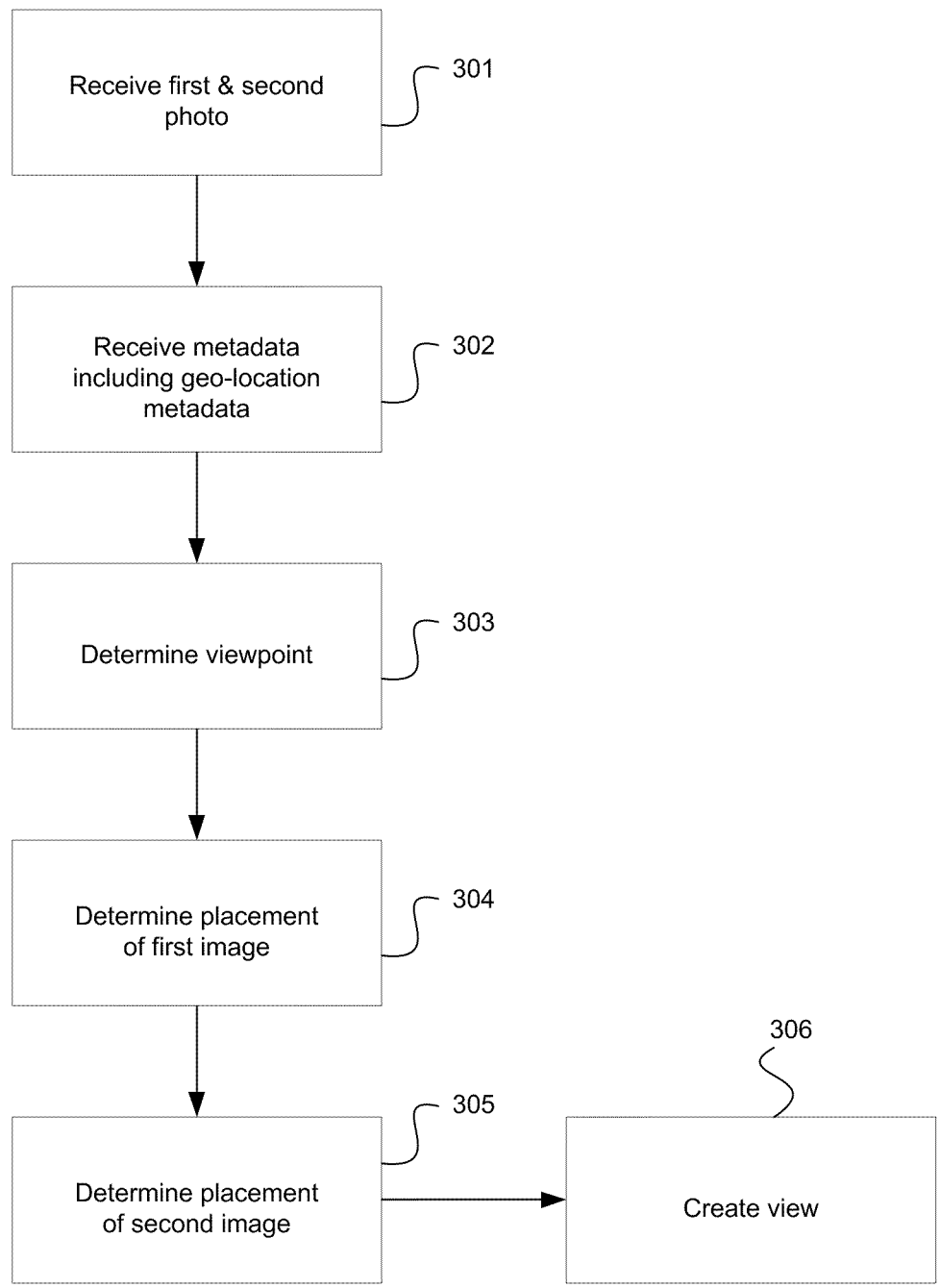
FIG. 3 is a flow diagram of an embodiment of a process for creating a view based on images and metadata received.

FIG. 3 is a flow diagram of an embodiment of a process for creating a view based on images and metadata received. Flow diagrams as illustrated herein provide examples of sequences of various process actions. Although shown in a particular sequence or order, unless otherwise specified, the order of the actions can be modified. Thus, the illustrated implementations should be understood only as examples, and the illustrated processes can be performed in a different order, and some actions may be performed in parallel. Additionally, one or more actions can be omitted in various embodiments of the invention; thus, not all actions are required in every implementation. Other process flows are possible.

A rendering device may receive a first and a second photo, 301. Said photos may or may not include overlapping content. The rendering device may further receive metadata associated with the first and the second image, 302. In one embodiment, metadata for the first and second image must contain geo-locating data relative to the content of each image. Based on the contents of the images received and the metadata received, a viewpoint may be determined, 303. The viewpoint is to be an estimation of the location and orientation of the camera during video/photo acquisition. Certain factors related to the content of the image (e.g., image capture device utilized a zoom lens during image capture) and the geo-locating metadata (i.e., level of accuracy of geo-locating information) may increase or decrease the accuracy of the determined viewpoint. Based on said viewpoint, the first image is placed within the view, 304. The second image is placed within the view relative to the first image and the viewpoint, 305. The view is then created and transmitted to a display device, 306.

Figure 4:
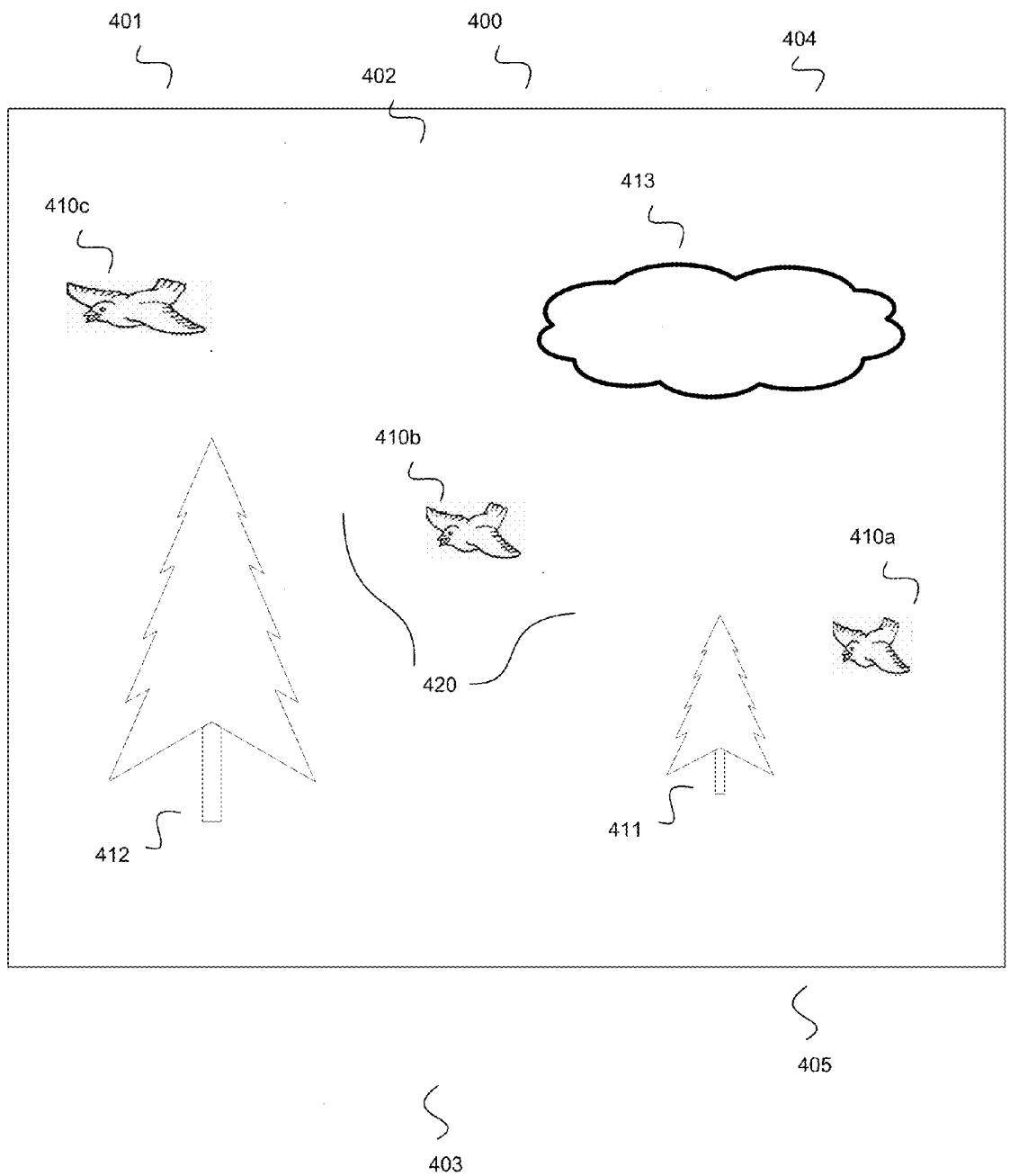
FIG. 4 illustrates an example a view including "moving" non-static content of a collection of images within a rendered view.

FIG. 4 illustrates an example a view including "moving" non-static content of a collection of images within a rendered view. View 400 includes a collection of images 401-405. In this example, these images all contain overlapping content. Thus, these images are displayed and rendered in a continuous manner in view 400 similar to FIG. 2 reference element 206. However, features described with respect to this figure are not limited to collections wherein all images contain overlapping content.

Images 401-405 each contain at least a portion of static content 411 (tree), 412 (tree) and 413 (cloud). Images 401, 402 and 405 contain moving object 410a, 410b and 410c respectively (bird flying). In one embodiment, view 400 is displayed with moving content rendered to "move" through view 400 based on the related 3D orientation metadata associated with each image. For example, suppose images 401-405 were captured from an image capture device at a stationary location using a zoom lens fixed to a constant focal length. In this example, the timing of the movement of object 410a-c may be determined based only on temporal metadata. However, if images 401-405 were captured while the image device was moving (for instance, in the opposite direction of the flight the bird) and the focal length of the zoom lens was varied for each image, additional 3D orientation metadata such as geographical information, magnetic field information (e.g., magnetic pole directional information), and spatial information (including information related to movement—i.e., acceleration and angular momentum) may be used to determine the timing of the movement of object 410a-c.

On one embodiment, a rendering device computes estimated "flight path" 420 of the moving object and projects objects 410a-410c consistent with flight path 420. In another embodiment, a viewer may elect to focus on object 410a, and thus static content within view 400 is moved consistent with flight path 420.

Figure 5:
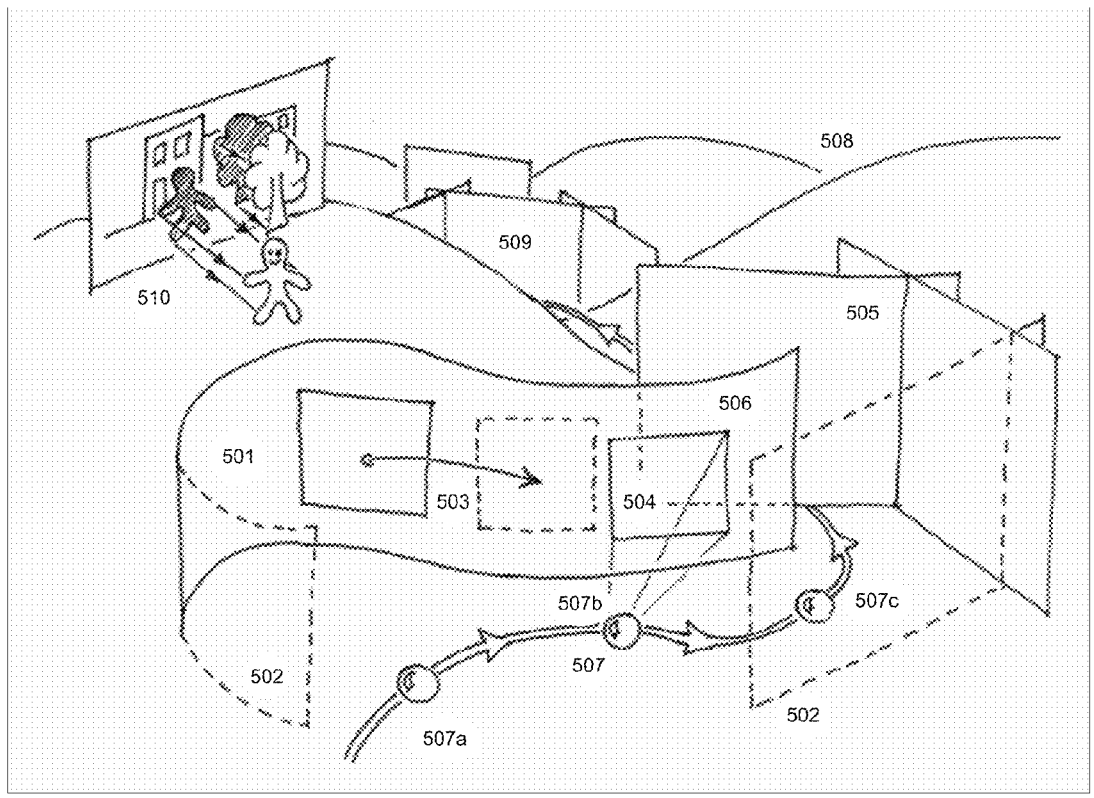
FIG. 5 illustrates an embodiment of an immersive 3D environment and several image display features that may be rendered for images.

FIG. 5 illustrates an embodiment of an immersive 3D environment and several image display features that may be rendered for images using the image content and the related metadata for each image. Several features are referenced below by a particular phrase or label. Other labels could alternatively be applied to the each of the example display features described below.

Furthermore, the features described below as utilizing "video content" may also utilize photo content. Where video content is used to illustrate features, those skilled in the art know that video content is comprised of a plurality of video frames, each of which is similar to a photo. Thus, a collection of photos may be utilized in the features described below that discuss displaying video data in example embodiments.

Feature 501 is a video/photo panorama display feature to render images such that every pixel is rendered in its appropriate spatial location. In one embodiment, video content is summarized and displayed by stitching "consecutive" video frames together in a manner in which every pixel visible from a viewpoint is displayed and redundant information is eliminated. With regard to video content, in one embodiment consecutive video frames may be stitched together into a panoramic view such that every pixel visible in the video will be rendered in its appropriate spatial location. Assuming any movement in viewpoint from the video capture device, said panoramic view will be larger than a single video frame. A photo panorama display feature, in one embodiment, is rendered in a similar fashion, wherein consecutive photos are "stitched" together. Non-consecutive photos may be displayed in a manner similar to the embodiment illustrated in FIG. 2, reference elements 204 and 206.

Video content manipulated as a collection of video frames results in significant redundant content amongst each frame. Redundant information in a collection of images may be filtered by statistical techniques that include, but are not limited to, statistical measures of calculating consistent static background across multiple frames, combining redundant information to reduce image capture device (e.g., camera) noise, and video super-resolution to increase the panorama resolution beyond the original resolution. In one embodiment, panorama 501 of rendered video/photo images is displayed as a flat, wallpaper style panorama containing the video/photo image content. In another embodiment, 3D orientation metadata is available for every video or photo image, and thus the rendered content may be used to create a 3D representation in which the panorama is warped and mapped onto a plane in 3D space. In one embodiment, the initial viewpoint of the panorama is an estimation of the location and orientation of the camera during video/photo acquisition.

In one embodiment, the photo or video captured under the lowest image resolution determines the resolution of the rendered panorama. In another embodiment, methods known in the art for increasing photo and video resolution are used to render a panorama at the highest resolution possible.

Feature 502 provides a rendering of the additional sides (e.g., the reverse side) of image content. In one embodiment, rendering the reverse side of an object allows the viewer to move her "viewpoint" of the display to the opposite side of an object within the content. For example, rendering of the additional sides of image content may allow a viewer to view multiple sides of a building or structure in the true spatial relation of the actual building or structure. Note that as previously stated, such photo or video content need not contain overlapping image content—for example, geo-locating metadata may be used to properly place the appropriate image data.

Feature 503 provides rendering a video or "moving image" replay within the rendered panorama, thus displaying a "videorama." While the example below illustrates this feature with the use of video data, any type of "moving" image rendering (e.g., the example embodiment of FIG. 4 with bird 410a-c "flying" through display 400) may be utilized by this feature.

As discussed above, feature 501 may produce static 3D spatial representations of video content; however, processing said video content as a collection of frames and "stitching" them together loses the temporal relation of each frame. Feature 503 may display video content as a "videorama"—a hybrid space-time display of videos wherein time-varying information is rendered within the video panorama rendered by feature 501. This feature allows for simultaneous rendered information to be displayed across space and time. In one embodiment, the video data may be displayed automatically in a default mode of replaying the entire video (and looping through it). In another embodiment, video content may be controlled via a user interface (e.g., a "time slider" bar displayed within the panorama).

In one embodiment, "videorama" includes producing the static panorama display described in feature 501, and displaying video content within the static panorama at the appropriate spatial location within the panorama (determined by geo-locating data) at the frame rate of the video content. This creates the effect of watching a video within a panorama that covers the entire spatial extend of the video content. This allows a viewer to experience an artificial "peripheral vision" of the "static" content that appears at different times in the video while focusing on the "moving" action in real time.

In another embodiment, "videorama" includes displaying video content that takes place in different locations within the panorama simultaneously within the respective location of the panorama. This creates the effect of simultaneous action across the entire panorama, wherein different locations of "moving" images correspond to different time windows within the video.

In another embodiment, if the static panorama display was created by extracting static background pixels, pixels that correspond to moving objects may be identified via statistical techniques. For example, instead of displaying entire video frames within the panorama, only segmented foreground pixels can be displayed within the panorama at the appropriate time (i.e., a temporally accurate representation of the video), thus creating the effect of individual objects moving across the panorama without showing the outline of the entire video frames.

Feature 504 allows alignment and display of photo/video content of areas within the panorama. This feature provides the viewer with the ability to zoom into certain panorama areas to reveal existing higher resolution photo or video content. In one embodiment, zooming is accomplished by smoothly blending between the video and the photo once the zoom level exceeds the panorama resolution. In another embodiment, photos may be aligned and integrated into the panorama replacing the previously rendered portion of the panorama in the covered area.

Feature 505 allows the display of photos and video content based on geo-location and 3D orientation of the image capture device. Multiple overlapping photos can be geometrically aligned into a seamless patchwork of photos and displayed in their absolute location and relative orientation. This creates a 3D photo panorama that illustrates the geometric location of content in different photos relative to each other. As described previously in FIG. 2, such a display is possible with relatively few photos with no overlapping data due to the associated metadata (e.g., geo-locating metadata, additional 3D orientation metadata).

Feature 506 allows simultaneous display of all video and photo data within the rendered video panorama to create a seamless 3D view of the spatial information covered by the content of said videos and photos. This allows for a convenient overview of all photo and video content taken at a certain location. Photo and video data may contain a visible frame for each item, or blended seamlessly within a rendered panorama. Thus, said rendered panorama display may contain static and moving content.

Feature 507 utilizes the associated metadata of the photos/videos to display the path taken by the user of the image capturing device that captured said photos/videos. In one embodiment, the entire path taken by the user is displayed based on continuously recorded GPS data. In another embodiment, an estimated path is displayed and GPS event data (e.g., GPS metadata that was recorded only when photo images were captured) is highlighted via icons 507a-507c. In another embodiment, the path displayed may be traversed in the same speed and position as the image capturing device captured the related photo or video data, utilizing related 3D orientation metadata and the content of the photos/videos displayed.

The path displayed may be used to browse a rendered photo/video collection. In one embodiment, the display path generated by feature 507 allows a viewer to browse a photo/video collection by following the patch along which images were captured, or by clicking on icons 507a-507c along the path. In one embodiment, display via rendered path is manually controlled by a user interface. In another embodiment, the rendered path is traversed according to the related 3D orientation metadata and the collection is viewed at a speed based on the temporal metadata.

Feature 508 allows any rendered "videorama" produced by feature 503 to be displayed on available topographical data. In one embodiment, topographical data is used to display a photo or video collection rendered according to 3D topology of the content. Topographical data may be determined based on the image content and the related 3D orientation metadata. Topographical data may also be provided in addition to the related image metadata.

Feature 509 allows for rendered image and video panoramas to be grouped according to location and/or time to facilitate the management and exploration of large data sets. For example, a viewer may wish to view all photos and videos taken at the same location over time, in which case dense spatial coverage of the location is achieved. In another embodiment, photos and videos are displayed according to temporal data, thus panoramas from numerous locations are displayed for the user based on the time the rendered photos and/or videos were captured.

Feature 510 allows content to be displayed according to 3D segmentation. Image and photo data may be rendered with associated 3D orientation metadata to generate a display such that, for example, moving pixels are displayed in 3D to accurately display spatial properties of moving content.

In addition to the above features, image and video collection may be augmented with text, audio and video information external to said photo and video collections.

Figure 6:
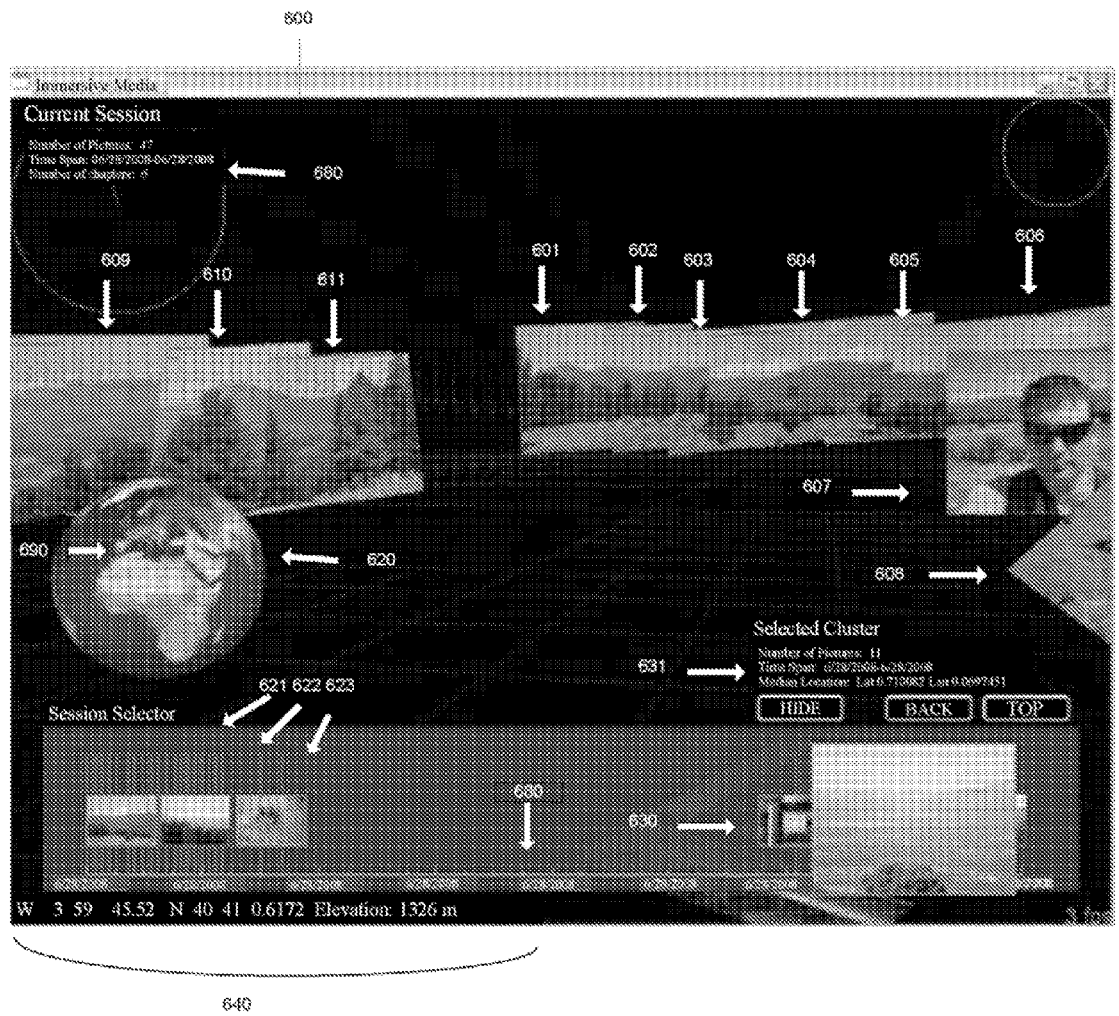
FIG. 6 illustrates an embodiment of a user interface to display rendered photo and video content.

FIG. 6 illustrates an embodiment of a user interface to display photo and video content rendered according to an embodiment of the invention. User interface 600 is an example of a photographic display of a rendered collection of eleven photos. Photos 601-611 are combined into a 3D visualization based on associated 3D orientation metadata. Photos 601-608 contain overlapping content, and photos 609-611 contain overlapping content. The photo collection is limited in that there is an area not captured by the photo collection (i.e., the void between images 611 and 601), and thus the display is not continuous; however, the content of photos 611 and 601 are still placed in accurate spatial relation to each other.

As previously mentioned in describing feature 507 in FIG. 5, 3D orientation metadata may also be rendered to provide a path to describe where photos were taken and the times when they were taken. This rendering allows a viewer to browse the collection following the path taken by the user of the image capture device, or randomly switching between locations, and further allows a viewer to browse photo collections as a function of space and time.

Map 620 shows how this particular subset of images spans a specific spatial location on the earth (in FIG. 6, images 601-611 were taken in Spain—this is denoted by location points 690). Location of the viewpoint of the rendered view within UI 600 is displayed as data 640. Temporal metadata is displayed in timebar 680.

Other photo collections are summarized within icons 621-623 in UI 600. Note that photo collection 601-611 is represented by icon 630, as said icon is displayed larger than icons 621-623. Furthermore, information related to photo collection 601-611 may be displayed as information 631 within the UI. In one embodiment, the image related metadata is used to display the number of photos in the collection, the time span said photos were taken, and the median location of the photo collection.

Metadata for all photo collections may be used to derive photo collection summary 680. Said photo collection summary informs a viewer of the number of photos within the entire collection, the time span of said photos, and the number of collections or "clusters."

The viewer may elect to transition through "clusters" by virtually flying through 3D space, clicking at collections zooming in and out, etc. In one embodiment, areas on map 620 which are not related to the content of the "clusters" may be rendered using image data external to the photo collection (e.g., any available map or topographical image data). In another embodiment, the viewer may select a specific time span and UI 600 will display the corresponding temporal clusters of images. In another embodiment, both spatial and temporal options are coupled. Thus, focusing on a specific time span (e.g., moving an icon on a timebar) automatically leads to navigating to the appropriate location and area in space and clicking on an area of map 620 leads to navigating to the appropriate temporal sorted cluster.

In addition to providing an intuitive way for browsing personal photo collections, UI 600 has an automatic summarization effect by removing redundancy of overlapping photo regions through alignment instead of displaying a large number of individual thumbnails. For example, in one embodiment photos 601-611 are captured in the same resolution; however, photos 601-611 and displayed in various shapes and orientations based on the overlapping content of each respective image and the related 3D orientation metadata. Clusters in space and time may be created automatically through clustering of images and related metadata.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

Various components referred to above as processes, servers, or tools described herein may be a means for performing the functions described. Each component described herein includes software or hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc. Software content (e.g., data, instructions, configuration) may be provided via an article of manufacture including a computer storage readable medium, which provides content that represents instructions that can be executed. The content may result in a computer performing various functions/operations described herein. A computer readable storage medium includes any mechanism that provides (i.e., stores and/or transmits) information in a form accessible by a computer (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A computer readable storage medium may also include a storage or database from which content can be downloaded. A computer readable medium may also include a device or product having content stored thereon at a time of sale or delivery.

The invention claimed is:

1. A method comprising:
receiving a first and a second image captured via an image capture device;
receiving a first metadata associated with the first image and a second metadata associated with the second image, the first metadata to include geo-location information of the image capture device that captured the first image, and the second metadata to include geo-location information of content of the second image;
determining a viewpoint of the first image, the viewpoint to represent location and orientation of the image capture device when the first image was captured;
creating a view based on the viewpoint of the first image and including the first image and the second image, wherein
placement and orientation of the first image in the view is aligned with the viewpoint of the first image, and
placement and orientation of the second image is aligned with the viewpoint of the first image and the content of the second image is spatially aligned with content of the first image consistent with their respective geo-location information; and
displaying the created view on a display device, wherein a void is displayed between the first and second image when the content of the first image does not overlap the content of the second image.

2. The method of claim 1, wherein the view further comprises a three-dimensional (3D) view.

3. The method of claim 1, wherein the first and second metadata includes magnetic field information of the content of the respective first and second image.

4. The method of claim 1, wherein the first and second metadata includes spatial information of the content of the respective first and second image.

5. The method of claim 1, wherein the first and second metadata includes temporal information of the content of the respective first and second image.

6. The method of claim 5, further comprising determining static content and moving content of the first and second image.

7. The method of claim 6, wherein the moving content of the first and second image is displayed within the view based on the temporal information of the respective first and second image.

8. The method of claim 1, wherein the first image included in the view comprises a still image file format and the second image included in the view comprises a video file format.

9. An apparatus comprising:
a data store to include
a first and a second image captured via an image capture device, and
a first metadata associated with the first image and a second metadata associated with the second image, the first metadata to include geo-location information of the image capture device that captured the first image, and the second metadata to include geo-location information of content of the second image;
a rendering module operatively coupled to the data store to access the first and second image and the first and second metadata, the rendering module to
determine a viewpoint of the first image, the viewpoint to represent location and orientation of the image capture device when the first image was captured, and
create a view based on the viewpoint of the first image and including the first image and the second image, wherein placement and orientation of the first image in the view is aligned with the viewpoint of the first image, and placement and orientation of the second image is aligned with the viewpoint of the first image and the content of the second image is spatially aligned with content of the first image consistent with their respective geo-location information; and
a display operatively coupled to the rendering module to access and display the created view, wherein a void is displayed between the first and second image when the content of the first image does not overlap the content of the second image.

10. The apparatus of claim 9, wherein the view further comprises a three-dimensional (3D) view.

11. The apparatus of claim 9, wherein the first and second metadata includes magnetic field information of the content of the respective first and second image.

12. The apparatus of claim 9, wherein the first and second metadata includes spatial information of the content of the respective first and second image.

13. The apparatus of claim 9, wherein the first and second metadata includes temporal information of the content of the respective first and second image.

14. The apparatus of claim 13, wherein the first and second images are rendered to determine static content and moving content of each image.

15. The apparatus of claim 14, wherein the moving content of each image is displayed within the view according to the temporal information of the moving content of the respective first and second image.

16. An article of manufacture comprising a non-transitory computer readable storage medium having content stored thereon to provide instructions to cause a computer to perform operations including:
receiving a first and a second image captured via an image capture device;
receiving a first metadata associated with the first image and a second metadata associated with the second image, the first metadata to include geo-location information of the image capture device that captured the first image, and the second metadata to include geo-location information of content of the second image;
determining a viewpoint of the first image, the viewpoint to represent location and orientation of the image capture device when the first image was captured;
creating a view based on the viewpoint of the first image and including the first image and the second image, wherein
placement and orientation of the first image in the view is aligned with the viewpoint of the first image, and
placement and orientation of the second image is aligned with the viewpoint of the first image and the content of the second image is spatially aligned with content of the first image consistent with their respective geo-location information; and
transmitting the created view to a display device, wherein a void is disposed in the created view between the first and second image when the content of the first image does not overlap the content of the second image.

17. The article of manufacture of claim 16, wherein the first and second metadata includes magnetic field information of the content of the respective first and second image.

18. The article of manufacture of claim 16, wherein the first and second metadata includes spatial information of the content of the respective first and second image.

19. The article of manufacture of claim 16, wherein the first and second metadata includes temporal information of the content of the respective first and second image.

20. The article of manufacture of claim 19, wherein the first and second images are rendered to determine static content and moving content of each image.

21. The article of manufacture of claim 20, wherein the moving content of each image is displayed within the view according to the temporal information of the moving content of the respective first and second image.

* * * * *